Patented Dec. 1, 1936

2,062,898

UNITED STATES PATENT OFFICE 2,062,898

DYEING WOOL

William R. Moorhouse, Boston, Mass., assignor to National Aniline & Chemical Company, Inc., New York, N. Y., a corporation of New York No Drawing. Application October 26, 1933,
Serial No. 695,326

19 Claims. (Cl. 8—5)

This invention relates to the art of dyeing wool fibers by a printing process, and more particularly to the dyeing of wool slubbing and wool yarn by a printing process. It relates especially to dyestuff and printing pastes of wool dyes, especially those for use in Vigoureux printing, as well as to processes for the production or application thereof.

In dyeing wool slubbing by a printing process (so-called Vigoureux printing) the wool slubbing is printed with a suitable printing paste containing the dye and suitable additional materials such as an acid and/or a mordant, and a thickener; and the resulting printed slubbing is steamed, for example for several hours, to fix the dye and is then further spun into yarn and finished. The dyes generally employed in the preparation of the printing paste are usually the sodium salts of acid and mordant wool dyes and are generally placed on the market in the form of powders. Owing to the fact that the printing process involves reaction of the dye in the free form, it is necessary that the printing paste contain a sufficient amount of acid to liberate the dye from its salt in addition to that required in the process.

An object of the present invention is to provide improvements in the dyeing of wool fibers in the form of slubbing and yarn by a printing process. Another object of the present invention is to provide wool dyes which contain an acid group, and which are suitable for dyeing wool slubbing and yarn, in a more advantageous form for incorporation into printing pastes.

Other objects of the invention will in part be obvious and will in part appear hereinafter.

I have found, according to the present invention, in dyeing wool by a printing process, and particularly in dyeing wool yarn and slubbing by a printing process with the aid of acid and mordant wool dyes, that the inclusion in the printing paste of an organic compound containing a hydroxyl group and an ether radical linked to the same non-benzenoid hydrocarbon radical effects marked improvements in the printing process and in the resulting prints. Thus, I have found, in dyeing wool slubbing by a printing process (Vigoureux printing) with the aid of a printing paste containing an azo chrome mordant wool dye, that the addition of diethylene glycol to the printing paste results in more complete utilization of the dye and its more complete fixation on the fiber.

I have furthermore found, in accordance with the present invention, by incorporating an organic compound containing a hydroxyl group and an ether radical linked to the same non-benzenoid hydrocarbon radical into an aqueous suspension of an acid or mordant wool dye containing an acid group, and particularly in the free form, that compositions are obtained which are of especial value for incorporation into printing pastes for dyeing wool by a printing process, and particularly by the Vigoureux printing process.

The invention accordingly comprises compositions having the properties and proportions of ingredients exemplified in the compositions hereinafter disclosed and the processes comprising steps and their relation exemplified in the processes hereinafter disclosed. The scope of the invention will be indicated in the appended patent claims.

In the practice of the present invention, an organic compound containing a hydroxyl group and an ether radical linked to the same non-benzenoid hydrocarbon radical is incorporated into a dyestuff paste to be used i. making a printing paste, or into a printing paste, containing an acid or mordant wool dye, preferably in the form of the free acid, whereby dyestuff and printing pastes having highly desirable properties are obtained.

The said organic compounds employed in accordance with the present invention comprise the hydroxyl ether compounds having the formula

HO—R—O—R' in which

R represents a non-benzenoid hydrocarbon radical which may contain one or more additional substituents selected from the group consisting of ether, thioether, and ester radicals; and especially an alkyl, alkylene or cycloparaffin radical which may contain one or more additional substituents selected from the group consisting of ether, thioether and ester radicals; and R' represents a hydrocarbon radical which may contain one or more substituents selected from the group consisting of hydroxyl, ether, thioether and ester radicals; and more particularly an alkyl, alkylene, cycloparaffin, aryl or aralkyl hydrocarbon radical which contains a hydroxyl group as a substituent and may be further substituted by an ether group and/or an ester group.

Those compounds in which R of the above formula represents an open-chain aliphatic hydrocarbon radical and R' represents an open-chain aliphatic hydrocarbon radical containing a hydroxyl group as a substituent are of particular interest in connection with the present invention.

Among the compounds which are included within the above formula and which may be employed in accordance with the present invention are the following: the hydroxyalkyl ethers of polyhydric alcohols, more particularly the polyhydroxyalkyl ethers, and especially the dihydroxyalkyl ethers (as for example, diethylene glycol, dipropylene glycol, dibutylene glycol, diglycerin, triethylene glycol, triglycerin, hydroxyethyl ether of glycerin, etc.); those of the alkyl, aralkyl and aryl ethers of the polyhydric alcohols which correspond with the foregoing formula, especially the monoalkyl ethers, monoaralkyl ethers, and monoaryl ethers of the polyhydric alcohols, and particularly of ethylene glycol, of propylene glycol, of glycerin and of the polymethylene glycols (as for example, glycerin ethyl ether, monomethyl or dimethyl ether of glycerin, monomethyl or monoethyl or monophenyl or monocresyl ether of ethylene glycol, monomethyl or monoethyl or monopropyl or monoisopropyl or monobutyl or monoisobutyl or monoisoamyl ether of propylene glycol, etc.); the monoalkyl ethers, monoaralkyl ethers, and monoaryl ethers of the polyhydroxyalkyl ethers and especially of the dihydroxyalkyl ethers (as for example, monomethyl or monoethyl or monopropyl ether of diethylene glycol or dipropylene glycol or dibutylene glycol, monobutyl or monophenyl ether of diethylene glycol, monophenyl ether of triethylene glycol, monophenyl ether of tetraethylene glycol, etc.); the esters of polyhydroxyalkyl ethers, more particularly of dihydroxyalkyl ethers, and especially of diethylene glycol (as for example, diethylene glycol monoacetate, di-trimethylene-glycol-ether monoacetate, etc.); and the like.

Preferably those of the said compounds which are liquid at ordinary temperatures are employed in accordance with the present invention. Those which are also capable of dissolving considerable amounts of water, and especially those which are miscible with water in all proportions, are employed in the preferred practice of the present invention.

The invention will be further described in connection with the following examples which are given for illustrative purposes only, it not being intended to limit the procedure to the details given. The parts are by weight.

*Example 1.*—A dyestuff paste is prepared by slowly adding 1100 parts of an undried press cake containing about 495 parts of National Superchrome Black BN Extra (Color Index No. 204), in the form of the free acid, as obtained in the course of its manufacture, and about 605 parts of water, to a well-stirred mixture of 1381 parts of diethylene glycol and 206 parts of water. The mixture is stirred until it is substantially homogeneous. The resulting dyestuff paste is suitable for direct incorporation into a printing paste for the dyeing of wool slubbing by the Vigoureux printing process.

*Example 2.*—A printing paste is prepared by mixing 12.5 parts of water
1.5 parts of wheat flour
0.5 part of white dextrine cooking the mixture, cooling and adding 5 parts of the dyestuff paste of Example 1
1 part of acetic acid (56 per cent) and
2 parts of chromium acetate (30° Twaddell).

The resulting paste is applied to wool slubbing by a printing roll of the usual type employed in Vigoureux printing processes and the printed slubbing is steamed for ½ to 2 hours and finished in the usual manner. The resulting prints are fuller and show a more complete utilization of the dyestuff and a higher degree of penetration as compared with prints made under the same conditions but in the absence of diethylene glycol.

It will be realized by those skilled in the art that the invention is not limited to the details of the above examples, but that change may be made in the materials employed and their proportions, as well as in the details of their preparation and use, within the scope of the appended patent claims.

In the preparation of a dyestuff paste such as is illustrated in Example 1, the percentage composition of the various ingredients employed may be varied, depending upon the particular substances employed and the desired strength of the dyestuff paste to be produced. While, in the above Example 1, diethylene glycol and water are employed in the ratio of about 1.7 to 1, other proportions of said substances may be employed. Furthermore, instead of diethylene glycol, other suitable organic compounds containing a hydroxyl group and an ether radical linked to the same non-benzenoid hydrocarbon radical may be employed, as for example those above mentioned. Preferably the ratio of the hydroxyl ether compound to water in the dyestuff paste is such that the mixture suffers little or no change in composition due to absorption or loss of water upon exposure to the air.

Various acid and mordant wool dyestuff containing an acid group, and especially a sulfo group and/or a carboxyl group, may be made into dyestuff pastes and/or printing pastes in accordance with the present invention, including those which are azo dyestuffs and those which are derivatives of anthraquinone (so-called alizarine dyestuffs). The following table illustrates additional wool dyestuffs which may be employed in the preparation of dyestuff and printing pastes in accordance with the present invention; for example, instead of the National Superchrome Black BN Extra of Example 1.

| Wool dyestuff | Color Index No. |
| --- | --- |
| National Superchrome Blue ZF | 202 |
| National Superchrome Blue BG | 201 |
| National Superchrome Yellow GN | 195 |
| National Superchrome Yellow RN | 197 |
| National Superchrome Garnet Y | 168 |
| National Superchrome Red B | 216 |
| National Superchrome Red ECB | 652 |
| National Alizarol Brown RH | |
| National Alizarol Orange R | 40 |
| National Superchrome Blue B Extra | 202 |
| National Alizarol Black 3G | |
| National Buffalo Chrome Black F | 299 |
| National Alizarine Brown R | 1035 |
| National Alizarine Cyanone Green G Extra | 1078 |
| National Alizarine Sapphire SE | 1053 |
| National Alizarine Blue Black BG | 1085 |
| National Alizarine Blue GRL | 1088 |

Preferably those dyestuffs which are azo chrome mordant dyes containing a sulfo group and/or a carboxyl group are employed in the preparation of dyestuff pastes and printing pastes to be used in printing wool slubbing by the Vigoureux printing process.

The dyestuff pastes of the present invention, such as the paste of Example 1, are not only valuable compositions by reason of the advantageous action of the hydroxyl ether compounds as assistants in the printing of wool slubbing and yarn, but they also have advantageous properties in themselves. Thus, said dyestuff pastes do not dry out upon standing, and accordingly may be permitted to stand in open containers. In addition, the pastes do not freeze at ordinary winter atmospheric temperatures, and accordingly can be shipped without special precautions.

The dyestuffs employed in the preparation of dyestuff pastes are preferably in the form of the free dyestuff (as for example the free acid) rather than in the form of the alkali metal salt, in which form they have been heretofore generally placed upon the market. By having the dyestuff in the free form in the dyestuff pastes of the present invention, printing pastes may be prepared more readily therefrom; since the dyestuff is already dispersed in a very finely divided state in the paste and mixes readily with the other ingredients of the printing paste. Furthermore, the dyestuff being in the free form results in economies in the preparation of the printing paste, in that less acid is needed than when a dyestuff in the usual salt form is employed.

The dyestuff may be obtained in the form of the free acid in its course of manufacture, or it may be produced by acidification of a suitable salt thereof in a manner well known to the art. It is preferably employed in the form of an aqueous suspension; as for example, the filter cakes or similar masses resulting from the filtration or other mechanical methods of separation of dilute aqueous suspensions thereof, such as those obtained in the course of manufacture of the dyestuff or by acidification of an alkali metal salt of the dyestuff with a suitable acid, as for example, hydrochloric acid, sulfuric acid and the like.

The invention is furthermore not limited with respect to the other ingredients which may be present in the pastes along with the dyestuffs and the hydroxyl ether compounds, and the pastes may be compounded in other suitable or convenient ways.

For the preparation of preferred aqueous dyestuff pastes in accordance with the present invention, there may be employed a range of proportions adapted to produce a dyestuff paste containing about 15 to 30 per cent by weight of dyestuff, at least about 40 per cent by weight of the hydroxyl ether compound, and at least about 10 per cent by weight of water. Thus, there may be employed from about 15 parts by weight of dyestuff in the free form, about 40 parts of hydroxyl ether compound (as for example, diethylene glycol), and the rest water, on the one hand, to about 30 parts of dyestuff, 60 parts of hydroxyl ether compound, and the rest water, on the other hand, per 100 parts by weight of paste. It may be noted that, for ease in the preparation of dyestuff pastes containing a relatively high percentage of the hydroxyl ether compound and a relatively low percentage of water, a paste may first be prepared containing a larger amount of water than desired in the final dyestuff paste, and water may be evaporated to produce the desired concentration.

The composition of the printing pastes prepared from dyestuff pastes of the present invention is not limited to the ingredients and proportions disclosed in the above Example 2, but also may be varied, as will be evident to those skilled in the art. Other printing assistants may be incorporated into the printing pastes in conjunction with the hydroxyl ether compounds employed in accordance with the present invention, as for example glycerin, ethanolamines, thioglycols, etc. Various acids may be employed in the preparation of the printing pastes, as is usual in wool printing. For example, formic, acetic, tartaric and oxalic acids may be employed, the choice of acid depending upon the particular dyestuff employed.

Printing pastes containing a hydroxyl ether compound as a printing assistant may also be prepared from other dyestuff preparations than the dyestuff pastes of the present invention. Thus, a printing paste may be prepared by mixing a suitable dyestuff in the usual solid form with diethylene glycol, or one of the other hydroxyl ether compounds of the present invention, and the other ingredients necessary for the production of a printing paste; as illustrated in the following example:

10 parts of dyestuff (as for example, one of those hereinbefore mentioned)
630 parts of water, and
200 parts of British gum are cooked together and then cooled. There are then added
20 parts of of sodium chlorate solution (1 part to 10 parts of water)
90 parts of oxalic acid solution (20 parts to 70 parts of water), and then
20 parts of diethylene glycol and
30 parts of chromium acetate (30° Twaddell).

It may be noted that for the preparation of printing pastes which are to be employed without standing for any considerable period of time after their preparation, it is only necessary to employ a sufficient amount of the hydroxyl ether compound to effect the desired improvement in the printing process. Thus, for example, about 1 to about 2 parts of diethylene glycol, and preferably about 2 parts of diethylene glycol, per part of dyestuff may be used in the preparation of a printing paste such as that disclosed in Example 3. It may be further noted that the hydroxyl ether compounds may be incorporated into a stock thickener and/or mordant composition for use in connection with a number of different dyestuffs in order to simplify the preparation of printing pastes containing said assistants.

Since in the practice of the invention changes may be made in the details of the process and compositions above disclosed without departing from the scope of the invention, it is intended that all matter contained in the above description shall be interpreted as illustrative, and not in a limiting sense.

It is further to be understood that the following claims are intended to cover, in addition to the generic and specific features of the invention herein described, all statements of the scope of the invention; which, as a matter of language, might be said to fall therebetween.

I claim:

1. In the art of dyeing wool fiber in the form of slubbing or yarn by a printing process, the improvement which comprises applying to said fiber a printing paste comprising a dye selected from the group consisting of the acid and mordant wool dyes, and an organic compound containing a hydroxyl group and an ether radical linked to the same non-benzenoid hydrocarbon radical.

2. In the art of dyeing wool fiber in the form of slubbing or yarn by a printing process, the improvement which comprises applying to said fiber a printing paste comprising a dye selected from the group consisting of the acid and mordant wool dyes and a hydroxyl ether compound having the formula HO—R—O—R' in which R represents a non-benzenoid hydrocarbon radical which may contain one or more additional substituents selected from the group consisting of ether, thioether, and ester radicals and R' represents a hydrocarbon radical which may contain one or more substituents selected from the group consisting of hydroxyl, ether, thioether and ester radicals.

3. In the art of dyeing wool fiber in the form of slubbing or yarn by a printing process, the improvement which comprises applying to said fiber a printing paste comprising a dye selected from the group consisting of the acid and mordant wool dyes containing an acid group, and an organic compound containing a hydroxyl group and an ether radical linked to the same non-benzenoid hydrocarbon radical.

4. In the art of dyeing wool fiber in the form of slubbing or yarn by a printing process, the improvement which comprises applying to said fiber a printing paste comprising a dye selected from the group consisting of the acid and mordant wool dyes containing at least one of the acid groups sulfo and carboxyl, and a hydroxyl ether compound having the formula HO—R—O—R' in which R represents a non-benzenoid hydrocarbon radical which may contain one or more additional substituents selected from the group consisting of ether, thioether, and ester radicals and R' represents a hydrocarbon radical which may contain one or more substituents selected from the group consisting of hydroxyl, ether, thioether and ester radicals.

5. In the art of dyeing wool fiber in the form of slubbing or yarn by a printing process, the improvement which comprises applying to said fiber a printing paste comprising a dye selected from the group consisting of the acid and mordant wool dyes and diethylene glycol.

6. In the art of dyeing wool fiber in the form of slubbing or yarn by a printing process, the improvement which comprises applying to said fiber a printing paste comprising a dye selected from the group consisting of the acid azo and mordant azo wool dyes containing an acid group, and a hydroxyl ether compound having the formula HO—R—O—R''' in which R represents an open-chain aliphatic hydrocarbon radical and R''' represents an open-chain aliphatic hydrocarbon radical containing a hydroxyl group as a substituent.

7. In the art of dyeing wool fiber in the form of slubbing or yarn by a printing process, the improvement which comprises applying to said fiber a printing paste comprising an azo mordant wool dye and a hydroxyl ether compound having the formula HO—R—O—R''' in which R represents an open-chain aliphatic hydrocarbon radical and R''' represents an open-chain aliphatic hydrocarbon radical containing a hydroxyl group as a substituent.

8. In the art of dyeing wool fiber in the form of slubbing or yarn by a printing process, the improvement which comprises applying to said fiber a printing paste comprising an azo chrome mordant wool dye, a chromium salt and diethylene glycol.

9. A printing paste for dyeing wool fiber in the form of slubbing or yarn by a printing process, comprising a dye selected from the group consisting of the acid and mordant wool dyes, a thickener and an organic compound containing a hydroxyl group and an ether radical linked to the same non-benzenoid hydrocarbon radical.

10. A printing paste for dyeing wool fiber in the form of slubbing or yarn by a printing process, comprising a dye selected from the group consisting of the acid and mordant wool dyes containing at least one of the acid groups sulfo and carboxyl in the free acid form, a thickener and a hydroxyl ether compound having the formula HO—R—O—R' in which R represents a non-benzenoid hydrocarbon radical which may contain one or more additional substituents selected from the group consisting of ether, thioether, and ester radicals and R' represents a hydrocarbon radical which may contain one or more substituents selected from the group consisting of hydroxyl, ether, thioether and ester radicals.

11. A printing paste for dyeing wool fiber in the form of slubbing or yarn by a printing process, comprising a dye selected from the group consisting of the acid azo and mordant azo wool dyes containing an acid group, a metallic mordant, a hydroxyl ether compound having the formula HO—R—O—R''' in which R represents an open-chain aliphatic hydrocarbon radical and R''' represents an open-chain aliphatic hydrocarbon radical containing a hydroxyl group as a substituent.

12. A printing paste comprising an azo chrome mordant wool dye, a chromium salt and diethylene glycol.

13. A dye composition in the form of a paste comprising a suspension of a wool dye containing an acid group in a medium comprising an organic compound containing a hydroxyl group and an ether radical linked to the same non-benzenoid hydrocarbon radical.

14. A dye composition in the form of a paste comprising a suspension of a dye selected from the group consisting of the acid and mordant wool dyes in water and an organic compound containing a hydroxyl group and an ether radical linked to the same non-benzenoid hydrocarbon radical.

15. A dye composition in the form of a paste comprising a suspension of a mordant azo wool dye in water and a hydroxyl ether compound having the formula HO—R—O—R' in which R represents a non-benzenoid hydrocarbon radical which may contain one or more additional substituents selected from the group consisting of ether, thioether, and ester radicals and R' represents a hydrocarbon radical which may contain one or more substituents selected from the group consisting of hydroxyl, ether, thioether and ester radicals.

16. A dye composition in the form of a paste comprising a suspension of a mordant azo wool dye in the free form in water and a hydroxyl ether compound having the formula HO—R—O—R''' in which R represents an open-chain aliphatic hydrocarbon radical and R''' represents an open-chain aliphatic hydrocarbon radical containing a hydroxyl group as a substituent.

17. A dye composition of the type defined in claim 13 containing about 15 to about 30 per cent of the wool dye, about 40 to about 60 per cent of said organic compound, and at least about 10 per cent of water.

18. A dye composition in the form of a paste comprising a suspension of about 15 to about 30 parts by weight of a mordant azo wool dye in the free form in about 40 to about 60 parts by weight of diethylene glycol and sufficient water to make 100 parts.

19. A dye composition in the form of a paste comprising a suspension of about 15 to about 30 parts by weight of Superchrome Black BN Extra in about 40 to about 60 parts by weight of diethylene glycol and sufficient water to make 100 parts.

WILLIAM R. MOORHOUSE.